No. 878,081. PATENTED FEB. 4, 1908.
C. A. MEREDITH.
VEHICLE SPRING.
APPLICATION FILED SEPT. 3, 1907.

Witnesses
W. C. Stein

Inventor
Charles A. Meredith
by Hopkins & Ticks Attys

UNITED STATES PATENT OFFICE.

CHARLES A. MEREDITH, OF ST. LOUIS, MISSOURI.

VEHICLE-SPRING.

No. 878,081. Specification of Letters Patent. Patented Feb. 4, 1908.

Application filed September 3, 1907. Serial No. 391,245.

*To all whom it may concern:*

Be it known that I, CHARLES A. MEREDITH, a citizen of the United States, and resident of St. Louis, Missouri, have invented certain new and useful Improvements in Vehicle-Springs, of which the following is a specification.

This invention relates to improvements in vehicle springs and consists in the novel arrangement, construction and combination of parts as will be fully hereinafter described and claimed.

The object of my invention is to construct a spring of the elliptic type, one portion thereof being divided and pivotally supported on the axle and having an auxiliary spring attachment to provide a greater resiliency and dispense with the sudden jolting of the vehicle body.

Figure 1:
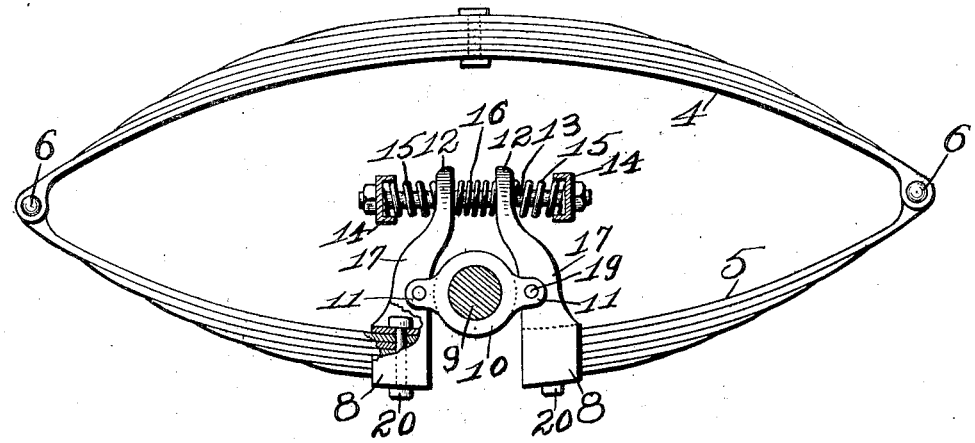
Figure 2:
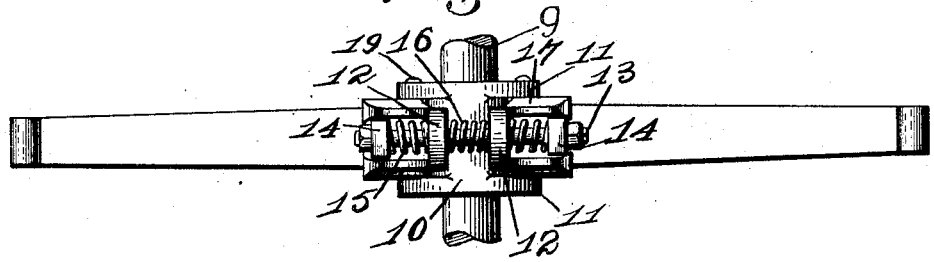
Figure 3:
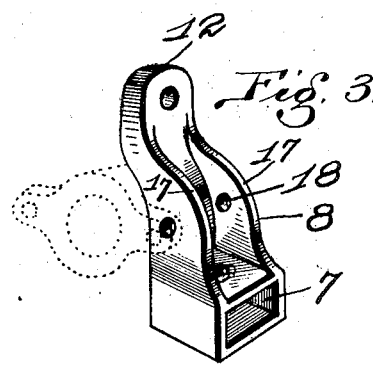

In the drawings: Figure 1 shows a side elevation of my complete invention. Fig. 2 is a top plan view of the same with the upper section of the elliptical spring removed. Fig. 3 is a detail perspective view of one of the supports made use of in carrying out my invention.

In the construction of my invention I provide a spring of the elliptic type consisting of an upper section 4 and a lower section 5, the ends of said sections being connected together in the usual manner at the points indicated by the numeral 6. The lower section 5 is divided into halves, the ends firmly secured in a socket 7 formed in the supports 8.

The supports 8 are so arranged as to be fitted on each side of the vehicle axle 9 and connected together by a sleeve 10 placed over the axle 9, and said sleeve is provided with perforated projecting lugs or ears 11 through which bolts are passed for retaining the same in position upon the supports 8.

The upper ends 12 of the supports are perforated, through which is passed a bolt 13, the said bolt being of sufficient length to permit the same to project a suitable distance; and on the ends of said bolt is placed a cap 14 to retain one end of a coiled spring 15 placed over the projecting ends of the bolt, the other end of said spring contacting with the outer surface of the support. Between the supports and upon the bolt is also placed a coiled spring 16 of weaker tension than the springs 15.

To provide proper strength to the supports 8, I form on the same stiffening ribs 17 in which are formed openings 18 for the passage of the bolts 19, which retain the sleeve 10 in position.

The ends of the lower section 5 of the elliptic spring are securely retained in position within the socket 7 by means of the bolts 20 passing through said springs and through the upper and lower wall of the socket, the construction of which is clearly shown in Fig. 1.

The formation of the spring together with the auxiliary spring carried by the supports is such that a better result can be obtained from a spring of this construction, giving a softer and more elastic movement to the vehicle body. As the pressure is imparted on the upper section of the elliptic spring; the lower ends of the supports have a tendency to move inwardly causing the upper ends to compress the coiled springs 15, and after the pressure is removed and the elliptic spring assumes its normal position, the sudden jolt is relieved by means of the upper ends of the supports contacting with the spring 16, causing an even movement. The spring is especially adaptable for automobile purposes to assist the pneumatic tires of the wheels, and is especially adapted to overcome the sudden jolting while the vehicle is passing over ruts or uneven road beds.

Having fully described my invention, what I claim is:

1. A spring of the class described comprising an upper section; a lower section; supports connected with the lower section; a sleeve mounted upon the axle of the vehicle and pivotally connected to the supports; an auxiliary spring carried by the supports to provide a more even and equal movement to the vehicle springs, substantially as specified.

2. A device of the class described comprising a spring of the elliptic type; a pair of supports connected to the lower section of said spring; a sleeve connected to said supports in combination with an axle upon which the sleeve is mounted; a bolt passing through the upper ends of the supports, and a plurality of springs mounted upon the bolt between and on each side of the supports to assist in the resiliency of the spring, substantially as specified.

In testimony whereof, I have signed my name to this specification, in presence of two subscribing witnesses.

CHARLES A. MEREDITH.

Witnesses:
WALTER C. STEIN,
COLGATE SCUDDER.